United States Patent [19]

Cannella

[11] 4,032,069

[45] June 28, 1977

[54] DAY-NIGHT PROGRAMMABLE THERMOSTAT

[75] Inventor: Joseph L. Cannella, Arlington Heights, Ill.

[73] Assignee: Candel, Inc., Arlington Heights, Ill.

[22] Filed: Aug. 18, 1976

[21] Appl. No.: 715,440

Related U.S. Application Data

[63] Continuation of Ser. No. 582,627, June 2, 1975, abandoned.

[52] U.S. Cl. ............................ 236/46 R; 236/68 B; 337/377
[51] Int. Cl.² ........................................ G05D 23/30
[58] Field of Search ........................ 236/46 R, 68 B; 219/511; 337/377, 102, 324, 327

[56] References Cited

UNITED STATES PATENTS

| | | | |
|---|---|---|---|
| 1,689,809 | 10/1928 | Vaughan | 219/511 |
| 2,261,582 | 11/1941 | Haines | 236/68 B |
| 2,491,931 | 12/1949 | Raker et al. | 219/240 X |
| 3,834,618 | 9/1974 | Buckwalter | 236/46 R |
| 3,934,217 | 1/1976 | Brick | 337/102 X |

Primary Examiner—William E. Wayner
Attorney, Agent, or Firm—Kinzer, Plyer, Dorn & McEachran

[57] ABSTRACT

A heat source, preferably a resistor or the like, is positioned adjacent the temperature sensing means of a conventional thermostat. A timer is electrically connected to the heat source and to a source of power to control the application of power to the heat source which in turn affects the temperature of air immediately adjacent the thermostat temperature sensing means which in turn controls the operation of the thermostat.

1 Claim, 6 Drawing Figures

DAY-NIGHT PROGRAMMABLE THERMOSTAT

This is a continuation of application Ser. No. 582,627, filed June 2, 1975 now abandoned.

SUMMARY OF THE INVENTION

The present invention relates to room thermostats of the type conventionally used in the home or office and particularly relates to means for automatically changing the effective temperature setting of the thermostat.

A primary purpose of the invention is a simply constructed reliably operable means for automatically adjusting the effective temperature setting of a thermostat.

Another purpose is a thermostat control unit of the type described which provides a timer controlled heat source adjacent the thermostat temperature sensing element.

Another purpose is a unit of the type described which provides a programmable timer, in circuit between a power source and a resistive heating element positioned adjacent the thermostat temperature sensing element.

Another purpose is a control unit of the type described including a transformer for reducing the voltage applied at the thermostat heating element.

Another purpose is a control unit of the type described which includes a programmable timer, physically separated a substantial distance from a thermostat and usable to control a heat source physically located at the thermostat.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
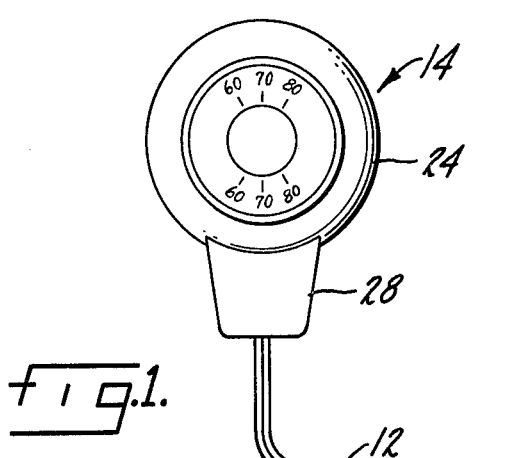
FIG. 1 is a schematic illustration of a thermostat and timer control as positioned on a wall.

In FIG. 1 a timer is indicated generally at 10 and may be connected by a conventional power cord 12 to a thermostat indicated generally at 14. The thermostat 14 is conventionally mounted on a wall, normally approximately five feet above the floor, and the timer 10 may be directly connected to a conventional wall outlet. The timer will plug into the wall outlet in a conventional manner.

Figure 2:
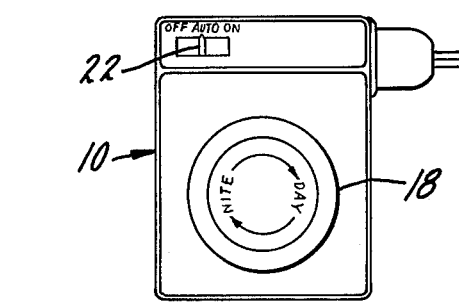
FIG. 2 is a side view of the timer shown in FIG. 1.
Figure 3:
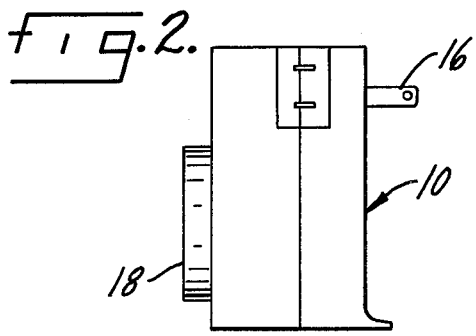
FIG. 3 is a side view, in part section, of the thermostat.

Looking specifically at FIG. 2, the timer 10 may have a pair of terminals, one of which is indicated at 16, which will plug into a wall outlet. The front of the timer has a day-night clock dial 18 which can be used to provide two time settings. Such timers are conventional in the art and are programmed to provide a switch closure during a predetermined portion of a 24-hour period. For example, the switch may close at 11:00 P.M. and open at 6:00 A.M., depending upon when the timer is to be used to reduce temperature in the room or area surrounding the thermostat. The timer 10 includes a switch 22 which is used to either place the timer in an automatic position, or in an on or off position. In the alternative, switch 22 may be located other than on the timer.

The thermostat 14 may be conventional and will have a heat sensing element, for example a bimetallic element. Such thermostats are quite common in the art and many such thermostats are manufactured by Honeywell Manufacturing Company. In the present invention, the conventional thermostat cover is replaced by a cover 24 which will fit correctly on the dial of the thermostat. Note particularly the inner curved surface 26 of FIG. 2 which will fit directly over the thermostat dial. Depending below curved surface 26 of thermostat 14 is a small housing portion 28 which mounts a resistor 30 between a pair of brackets 32. Cord 12 will have its wires 34 connected to opposite ends of resistor 30 so that the resistor may be supplied with electric power and controlled by the timer.

Figure 4:
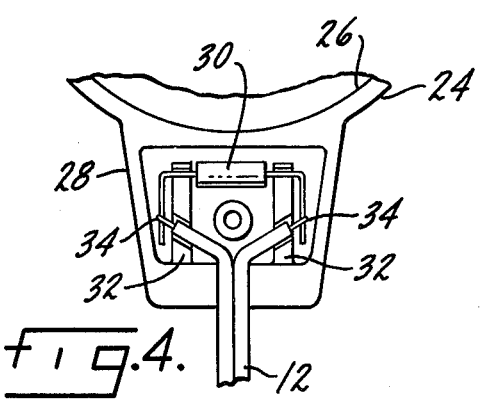
FIG. 4 is a partial rear view of the thermostat cover.
Figures 5, 6:
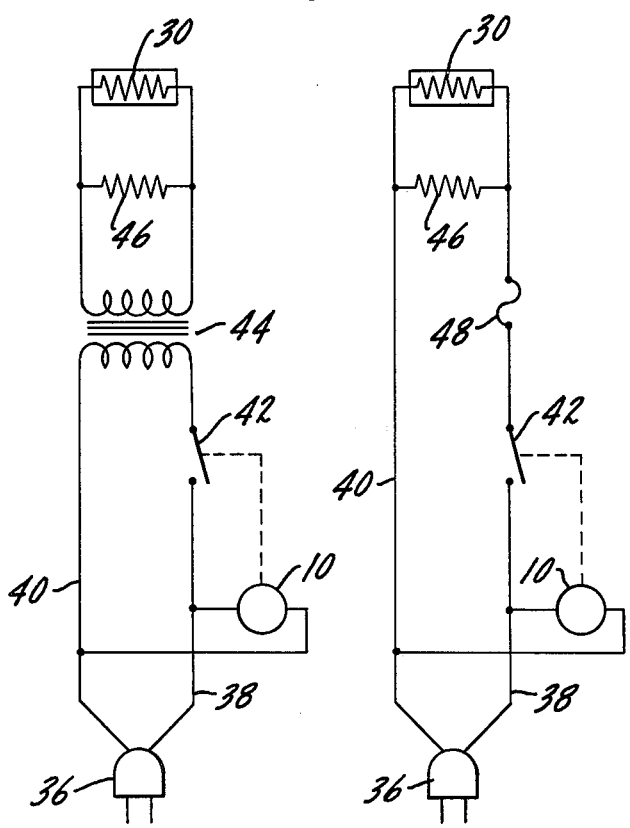
FIG. 5 is an electrical circuit diagram of one embodiment of the invention.
FIG. 6 is an electrical diagram of a second embodiment of the invention.

Looking particularly at FIG. 5, a source of power is indicated diagrammatically at 36 and is connected by a wire 38 to one side of timer 10. The opposite side of timer 10 is connected to wire 40. A switch 42, controlled by operation of timer 10 and normally physically positioned within the timer is connected to wire 38. Wires 40 and 38 are connected to the primary side of a transformer 44. The secondary of transformer 44 is directly connected to a resistor, which may be resistor 30 of FIG. 4. Connected in parallel with resistor 30 and physically located within the housing of timer 10 is a resistor 46. Both transformer 44 and resistor 46 are physically located within the housing of the timer. Cord 12 and wires 34 are diagrammatically illustrated in FIG. 5 by the connection between resistors 46 and 30.

In a second embodiment of the invention shown in FIG. 6, like parts have been given identical numbers. Transformer 44 has been removed and there is a direct connection between power source 36 and the parallel combination of resistors 46 and 30, again with resistor 46 being within the timer housing. A fuse 48, also positioned within the timer housing, will be included in the circuit.

The use, operation and function of the invention are as follows:

Home and office thermostats used for central heating and/or air conditioning systems normally control temperature within a degree or so of the dial setting. This is conventionally done with a bimetallic temperature sensitive switch which controls operation of the furnace and/or air conditioning unit. A change in the desired room temperature is normally brought about by resetting the dial on the thermostat within the room where temperature is to be controlled.

To achieve programmed temperatures for fuel saving or personal comfort, dual setting thermostats are conventionally provided. Such thermostats usually include an integral clock timer and switch to select which of two separate bimetallic switches, preset at respective desired temperatures, is engaged at a particular instance.

The present invention provides a programmed temperature changes on a time basis by placing a small heat source, preferably a resistor, adjacent the thermostat temperature sensing element. Power is supplied to the heat source on a programmed time basis. The application of a small amount of power to the resistor provides heat close to the temperature bimetallic sensing unit such that the temperature of the air immediately adjacent the sensing element is somewhat warmer than that of the surrounding room. The effect is to "fool" the thermostat into believing the general room temperature is higher than it actually is. This in turn results in a drop in room temperature proportional to the amount of temperature rise provided at the thermostat by the heat source.

Considering FIG. 5, timer 10 will control the application of power, through transformer 44, directly to heat element 30. The timer may be programmed to provide such power during the nighttime hours, when in the case of an office, the space is unused, or in the case of a residence when people are asleep and normally a lower temperature is desired. Transformer 44 will provide a stepdown voltage so that full 120 volt power is not actually present at the thermostat. Normally, heat element or resistor 30 may be set to provide a predetermined temperature differential, for example five degrees. Resistor 46 which is shown in parallel with resistor 30, but could also be in series, is used to more closely define and control the temperature difference. Resistor 46 may be replaceable or adjustable so as to vary the temperature differential. As indicated above, it is physically located within the timer housing. In some applications, resistor 46 may be a separate module which plugs into the timer with the power cord then plugging into the module.

The circuit of FIG. 6 operates in a substantially identical manner. However, in this case 120 volts is present at the thermostat. Fuse 48 may be either within the timer housing or it may be within the plug which connects the timer with the thermostat.

Of importance is the fact that thermostat cover 24 is a replaceable element taking the place of the conventional cover on the thermostat. Also of importance is the fact that the timer is physically separate from the thermostat, with only an inconspicuous cord connecting the thermostat being visible on the wall. The timer will conventionally be plugged into an adjacent electrical socket.

Although the invention has been described in connection with use for controlling a furnace, to control the application of heat to an area, it should be quite obvious that the same circuit and control means may be used to regulate an air conditioning system. The temperature differential may again be determined by the use of the space where the thermostat is located. Whereas, it may be desirable to lower the temperature during the evening hours during the winter when heat is provided, it may be desirable to maintain a cooler temperature during the daytime hours in an office and so save energy by permitting the temperature to rise during the evening. The invention has wide application and is quite flexible in controlling temperature differential at timed intervals during a 24-hour period.

Whereas the preferred form of the invention has been shown and described herein, it should be realized that there may be many modifications, substitutions and alterations thereto within the scope of the following claims.

The embodiments of the invention in which an exclusive property or privilege is claimed are defined as follows:

1. The combination with a thermostat having air temperature sensing means, a one-piece replaceable cover member positioned upon the thermostat and including a downwardly extending portion, a resistive heat source attached to and within said downwardly extending portion of the cover and positioned adjacent said temperature sensing means, a timer physically separated from the thermostat, cover and resistive heat source and having a power cord extending therefrom to be electrically connected to said resistive heat source and having a pair of terminals to be connected to a source of electric power, a transformer within said timer and electrically connected between said timer and resistive heat source for reducing the voltage from the source of power applied to said resistive heat source, a switch at said timer for controlling the application of power to said resistive heat source, and a resistor connected in parallel with said resistive heat source and physically located at said timer, said timer controlling the application of power to said resistive heat source which in turn affects the temperature of air immediately adjacent said thermostat temperature sensing means to control operation of said thermostat.

* * * * *